(12) United States Patent
He et al.

(10) Patent No.: US 10,940,928 B2
(45) Date of Patent: Mar. 9, 2021

(54) DIRECT-DRIVE ELECTRIC OUTBOARD ENGINE AND OUTBOARD ENGINE SYSTEM

(71) Applicant: Changzhou Golden Motor Technology Co Ltd., Changzhou Jiangsu (CN)

(72) Inventors: Zhang He, Changzhou Jiangsu (CN); Hongchang Liang, Changzhou Jiangsu (CN)

(73) Assignee: CHANGZHOU GOLDEN MOTOR TECHNOLOGY CO LTD., Changzhou (CN)

( * ) Notice: Subject to any disclaimer, the term of this patent is extended or adjusted under 35 U.S.C. 154(b) by 8 days.

(21) Appl. No.: 16/426,761

(22) Filed: May 30, 2019

(65) Prior Publication Data
US 2020/0017183 A1  Jan. 16, 2020

(30) Foreign Application Priority Data
Jul. 16, 2018 (CN) .......................... 201810782661.2

(51) Int. Cl.
*B63H 20/14* (2006.01)
*B63H 20/32* (2006.01)
*B63H 20/28* (2006.01)

(52) U.S. Cl.
CPC ............. *B63H 20/14* (2013.01); *B63H 20/32* (2013.01); *B63H 20/285* (2013.01)

(58) Field of Classification Search
CPC ...... B63H 20/14; B63H 20/32; B63H 20/285; B63H 1/20; B63H 2005/1258; B63H 21/17; B63H 20/00; B63H 21/26; B63H 21/265; B63H 21/28; H02K 1/30; H02K 1/2786; H02K 5/124; H02K 5/1285; H02K 21/22; H02K 7/14; H02K 7/003
See application file for complete search history.

(56) References Cited

U.S. PATENT DOCUMENTS 6,485,339 B1 * 11/2002 Hartig ................... B63H 5/125
440/6
6,638,122 B1 * 10/2003 Griffith, Sr. ......... H02P 25/0925
440/6
2015/0314849 A1 * 11/2015 Jehangir ................. B63H 1/20
417/423.3
(Continued)

FOREIGN PATENT DOCUMENTS

CN 103818535 A * 5/2014 ............... B63H 5/07
CN 104443340 A * 3/2015
(Continued)

*Primary Examiner* — Anthony D Wiest
(74) *Attorney, Agent, or Firm* — Mai-Tram D. Lauer; Westman, Champlin & Koehler, P.A.

(57) ABSTRACT

The present disclosure relates to the field of outboard engines, particularly to a direct-drive electric outboard engine and an outboard engine system for alleviating the problem of the existing outboard engines, i.e., incapability of simultaneously meeting requirements on rev and torque of different types of ships. The direct-drive electric outboard engine includes an external rotor mechanism and a stator mechanism; wherein the external rotor mechanism includes an external stator and an impeller; the external rotor is located outside the stator mechanism; and the impeller is located outside the external rotor.

13 Claims, 7 Drawing Sheets

(56) References Cited

U.S. PATENT DOCUMENTS

2017/0166288 A1* 6/2017 Claus ...................... H02K 5/00

FOREIGN PATENT DOCUMENTS

| | | | | | |
|---|---|---|---|---|---|
| CN | 105346696 | A | * | 2/2016 | |
| CN | 206968956 | U | * | 2/2018 | ............... B63H 5/07 |
| DE | 20121672 | U1 | * | 2/2003 | ............. B63H 11/08 |
| EP | 2762402 | A2 | * | 8/2014 | ............. B63H 20/28 |
| GB | 2050525 | A | * | 1/1981 | ............. F03B 13/10 |
| JP | S63247197 | A | * | 10/1988 | |
| KR | 20160052842 | A | * | 5/2016 | |

* cited by examiner

DIRECT-DRIVE ELECTRIC OUTBOARD ENGINE AND OUTBOARD ENGINE SYSTEM

CROSS-REFERENCE TO RELATED APPLICATIONS

The present disclosure claims priority to Chinese patent application NO. 2018107826612, filed with the Chinese Patent Office on Jul. 16, 2018 and entitled "Direct-drive Electric Outboard Engine", which is incorporated herein by reference in its entirety.

TECHNICAL FIELD

The present disclosure relates to the field of outboard engines, in particular, to a direct-drive electric outboard engine and an outboard engine system.

BACKGROUND ART

With the continuous improvement of consumers' living standards, there are ever-increasing demands for usage of outboard engines. An outboard engine refers to an engine for propulsion installed on the hull or on an outer side of the ship board, and is usually hung on the outer side of the stern plate, and hence is also referred to as an "off-ship engine". The outboard engine has a high level of integration, with a simple selective purchase and installation, thus plays the role of the preferred power for small boats for personal leisure and entertainment, and is also widely employed in fields of commercial operation and government law enforcement.

SUMMARY

Embodiments of the present disclosure provide a direct-drive electric outboard engine, including an external rotor mechanism and a stator mechanism; wherein the external rotor mechanism includes an external rotor and an impeller; the external rotor is located outside the stator mechanism; and the impeller is located outside the external rotor.

Embodiments of the present disclosure further provide a direct-drive electric outboard engine, including an external rotor mechanism, a stator mechanism and a third end cap; wherein the external rotor mechanism includes an external rotor and an impeller; the external rotor is located outside the stator mechanism; the third end cap is provided at an end of the stator mechanism, and the third end cap is relatively fixed to the external rotor; and the impeller is sleeved on the third end cap and is fixedly connected with the third end cap.

Embodiments of the present disclosure further provide an outboard engine system including the above described direct-drive electric outboard engine.

BRIEF DESCRIPTION OF DRAWINGS

In order to more clearly illustrate the technical solutions in the embodiments of the present disclosure, the accompanying drawings that need to be used in the embodiments will be introduced briefly below. It should be understood that the accompanying drawings below merely illustrate some embodiments of the present disclosure, and thus should not be considered as limitation on the scope. A person ordinary skilled in the art can still obtain other relevant accompanying drawings according to these accompanying drawings, without using creative effort.

REFERENCE SIGNS

Figure 1:
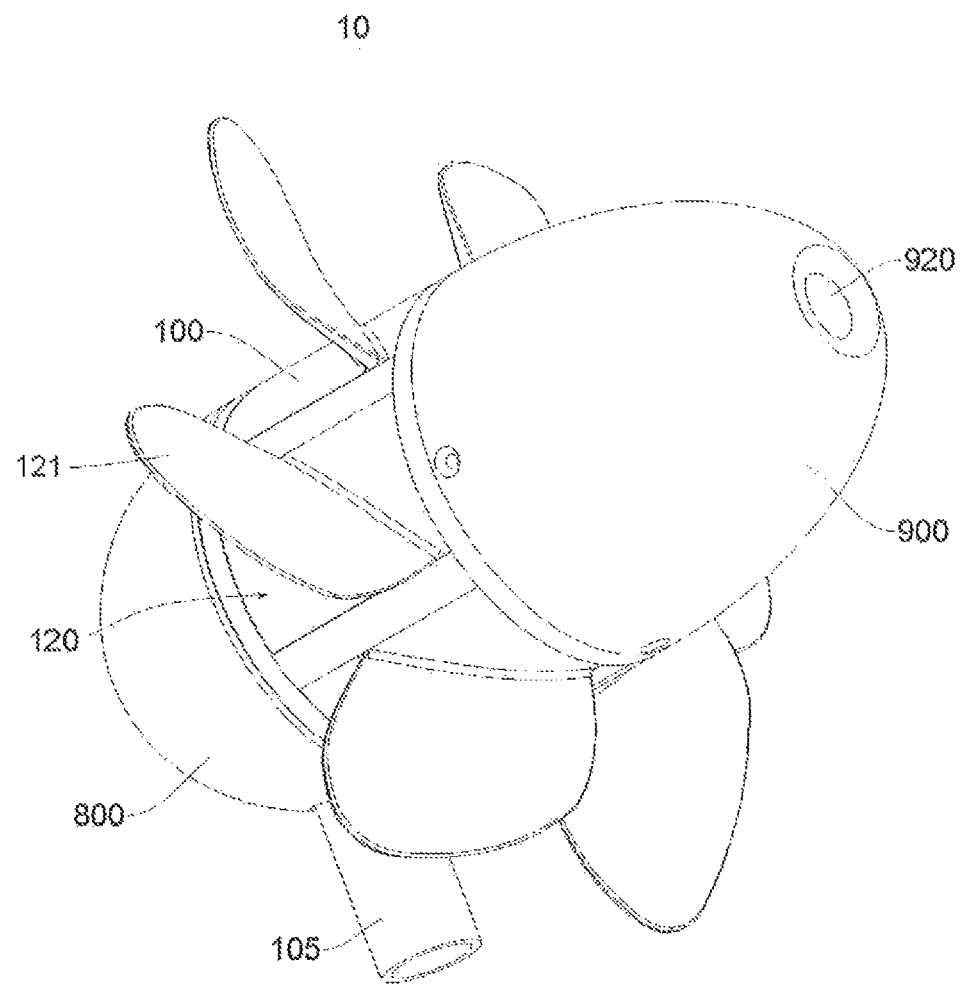
FIG. 1 is a structural schematic view, from a first angle of view, of a first direct-drive electric outboard engine provided in an embodiment of the present disclosure.

10—direct—drive electric outboard engine; 100—external rotor mechanism; 200—stator mechanism; 300—first end cap; 400—second end cap; 500—mounting base; 600—first bearing; 700—second bearing; 800—first fairwater; 900—second fairwater; 110—external rotor; 120—impeller; 111—permanent magnet; 112—magnetic conducting ring; 113—raised portion; 114—groove; 121—vane; 122—vane body; 123—mounting block; 210—fixed shaft; 220—stator; 810—first controller mounting area; 820—first through hole; 910—second controller mounting area; 920—second through hole; 101—controller module; 102—third end cap; 103—fourth end cap; 104—third fairwater; 105—mounting portion; 1061—first seal; 1062—second seal; 20—outboard engine system; 21—operation control structure; 22—mounting structure; 23—support structure; and 24—anti-vortex baffle.

DETAILED DESCRIPTION OF EMBODIMENTS

In order to make the objects, technical solutions and advantages of embodiments of the present disclosure clearer, the technical solutions in the embodiments of the present disclosure will be described below clearly and completely in combination with the accompanying drawings in the embodiments of the present disclosure. Apparently, the embodiments described are merely a part of, rather than all of the embodiments of the present disclosure. The components in the embodiments of the present disclosure described and illustrated in drawings herein may usually be arranged and designed according to various configurations.

Therefore, the following detailed description of the embodiments of the present disclosure provided in the drawings is not intended to limit the scope of protection of the present disclosure, but merely illustrates selected embodiments of the present disclosure. Based on the embodiments in the present disclosure, all the other embodiments, obtained by those ordinarily skilled in the art without using creative effort, shall fall within the scope of protection of the present disclosure.

It should be noted that similar reference signs and letters represent similar items in the following drawings. Therefore, once a certain item is defined in one drawing, it is not needed to be further defined or explained in subsequent drawings.

In the description of the present disclosure, it should be noted that orientation or positional relations indicated by terms such as "center", "upper", "lower", "left", "right", "vertical", "horizontal", "inner" and "outer" are based on orientation or positional relations as shown in the drawings, or orientation or positional relations in which this inventive product is usually placed when in use, merely for facilitating describing the present disclosure and simplifying the description, rather than indicating or implying that related devices or elements have to be in the specific orientation or to be configured and operated in specific orientation, therefore, they should not be construed as limitation on the present disclosure.

Besides, terms such as "first", "second" and "third" are merely for distinguishing descriptions, but should not be construed as indicating or implying relative importance.

Besides, terms such as "horizontal", "vertical", and "overhang" do not indicate that the component is obliged to be absolutely horizontal or overhang, it may be slightly inclined. For example, "horizontal" merely indicates that its direction is more horizontal relative to "vertical", rather than indicating that the structure has to be absolutely horizontal, instead, it may be slightly inclined.

In the description of the present disclosure, it should be noted that unless otherwise specified and defined, terms such as "provide", "mount", "communicate" and "connect" should be construed in a broad sense. For example, the connection may be fixed connection, detachable connection, or integrated connection; it may be mechanical connection or electrical connection; it may be direct connection or indirect connection via an intermediate medium; and it may also be an inner communication between two elements. For those ordinarily skilled in the art, specific meanings of the above mentioned terms in the present disclosure may be understood according to specific circumstances.

It is to be noted that the features in embodiments of the present disclosure can be combined with one another without conflict.

The structure of the existing outboard engine mainly has following deficiencies:

Firstly, an electric engine with internal rotor usually outputs high rev and low torque. If a propeller is required to cooperate with the high rev and low torque of the electric engine, an impeller with a small diameter has to be used, while in this case the electric engine puts a quite heavy resistance on passing water, thereby a cavitation region is likely to be formed in the region neighboring the propeller, resulting in occurrence of cavitation, thus the working efficiency of the outboard engine is greatly reduced, meanwhile the propeller is prone to be damaged by cavitation erosion.

Secondly, when driving is performed in combination with a speed change method by gearbox, there is a very high difficulty in both processing and manufacture of a gearbox with small diameter and high power, resulting in a particularly high cost and a poor stability. Meanwhile, with a low-rev outboard engine used, this type of outboard engine is only applicable to low-speed ships with heavy loads. Due to the low rev of the impeller thereof, the use effect is quite poor for ship types which require high traveling speed such as speed boats.

To sum up the above problems, the direct-drive electric outboard engines with conventional structures which are available on the market have output power intensively distributed at the scale of several hundreds of watts, with the highest thereof only reaching 2-3 kilowatts. An output power ranging in such scale can only be used for small or superminiature ships or for ships with extremely low speed, but cannot meet requirements for use on ship types demanding high traveling speed such as speed boats or on medium ship types with heavy loads.

Therefore, the existing outboard engine has the problem of incapability of simultaneously meeting rev and torque requirements for different types of ships.

Referring to FIG. 1 to FIG. 4, embodiments of the present disclosure provide a direct-drive electric outboard engine 10 enabling to alleviate the above-described problems, which specifically includes an external rotor mechanism 100 and a stator mechanism 200;

wherein the external rotor mechanism 100 includes an external rotor 110 and an impeller 120;

the external rotor 110 is located outside the stator mechanism 200; and the impeller 120 is located outside the external rotor 110.

After power on, magnetic flux is produced between the external rotor mechanism 100 and the stator mechanism 200, and the external rotor mechanism 100 starts to rotate around the axis of the stator mechanism 200. The impeller 120 is directly driven to rotate by means of rotation of the external rotor 110, to provide torque and speed for a ship.

Firstly, the direct-drive electric outboard engine 10 in the embodiments of the present disclosure is an outboard engine with external rotor, and an outboard engine with external rotor outputs a larger torque than an outboard engine with internal rotor, hence having a higher load capacity. For ships with high loads and low traveling speeds, multiple impellers 120 may be simply used for performing low-speed driving directly.

Secondly, as to the design of the external rotor mechanism 100 of the direct-drive electric outboard engine 10 in the present embodiment, the impeller 120 is directly mounted at the external rotor 110, thus transmission (drive) parts between the impeller 120 and the external rotor 110 are omitted and the impeller 120 can directly rotate on the maximum outside diameter of the external rotor 110, which effectively increases the rotation radius of the impeller 120 and avoids the problem of the engine body's resistance on passing water, thereby the area of the cavitation region is reduced with less cavitation produced, the transmission (drive) efficiency is improved, the damage to the propeller from cavitation erosion is reduced and the transmission parts between the impeller 120 and the electric engine in the structure of the existing outboard engine are omitted. For this reason, the rev is higher compared with the speed change method with gearbox, meanwhile, drop range of the rev is smaller than that of the electric engine with internal rotor, and the range of speed regulation is wider, thus alleviating the deficiency of low rev of common outboard engines with external rotors. The same is also applicable to ships demanding traveling in high speed such as speed boats.

The direct-drive electric outboard engine 10 in the present embodiment can not only meet requirements for use on ships with high loads and low traveling speed, but also is applicable to ships demanding traveling in high speed such as speed boats, therefore the direct-drive electric outboard engine 10 in the present embodiment can simultaneously meet requirements on rev and torque from different types of ships.

Figure 4:
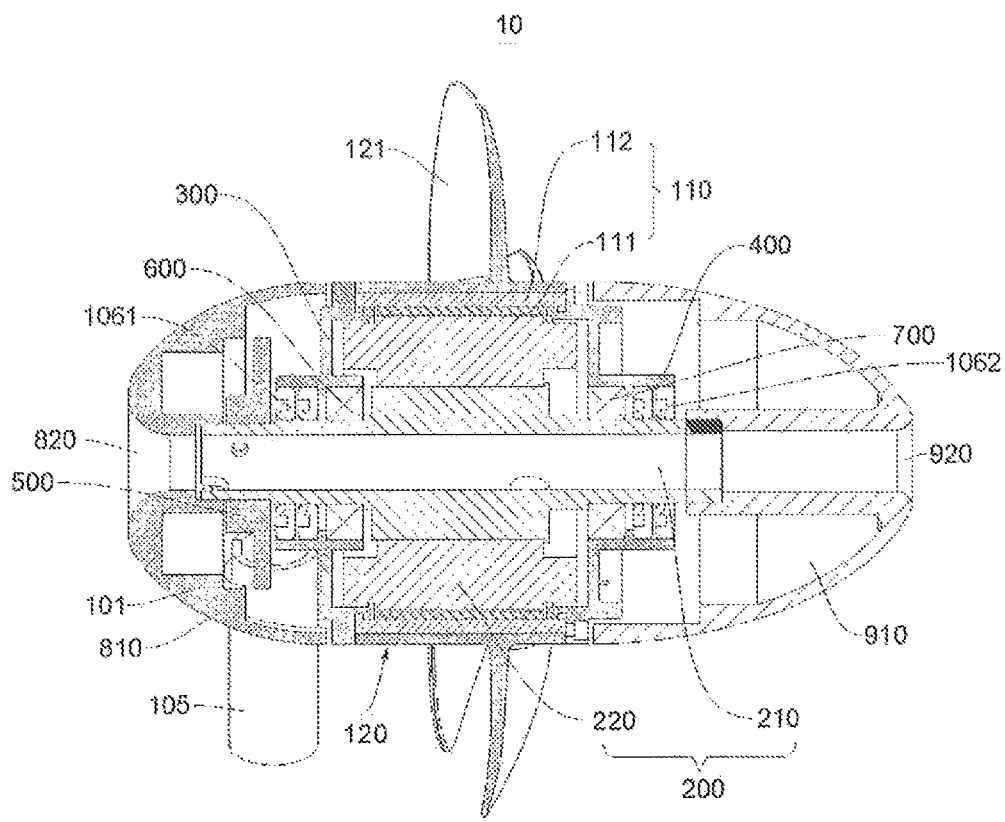
FIG. 4 is a structural schematic view, from a fourth angle of view, of the first direct-drive electric outboard engine provided in an embodiment of the present disclosure.
Figure 5:
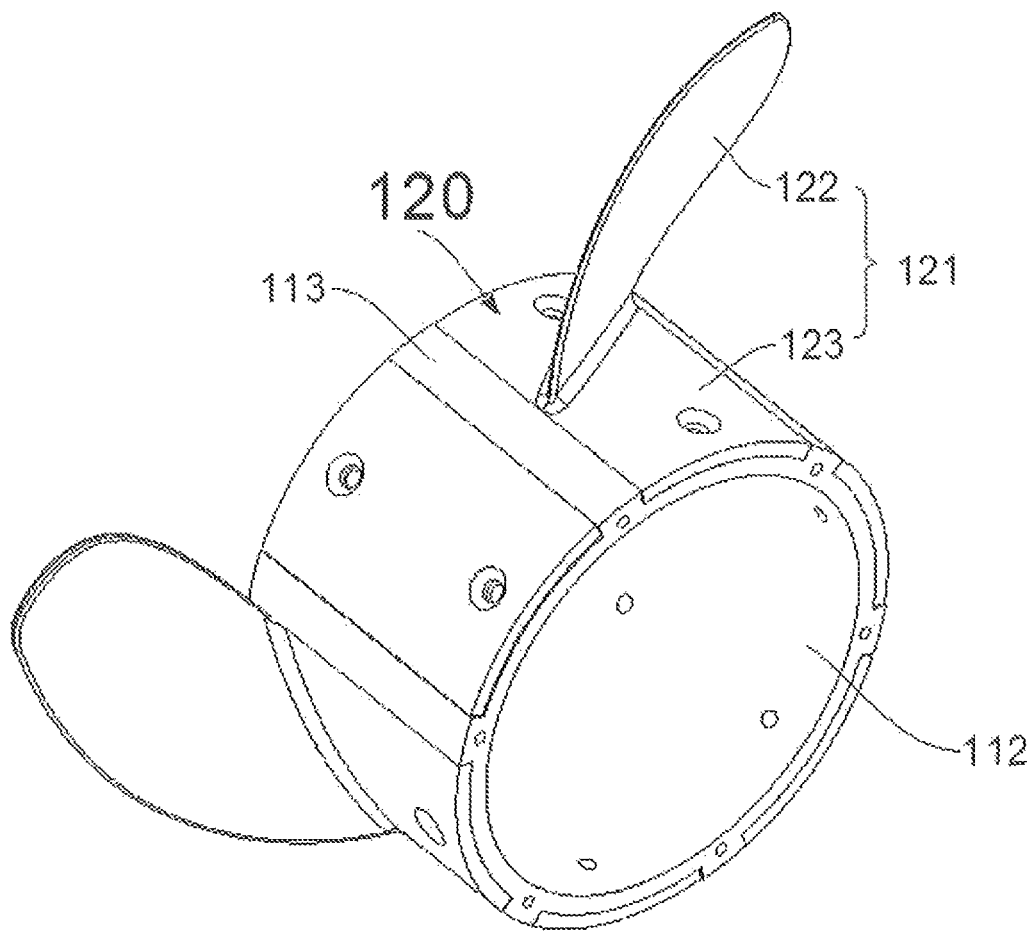
FIG. 5 is a structural schematic view of an external rotor mechanism of the first direct-drive electric outboard engine provided in an embodiment of the present disclosure.

Optionally, referring to FIG. 4 and FIG. 5, the impeller 120 includes a plurality of vanes 121 which are provided separately, wherein each vane 121 is in fixed connection with the external rotor 110.

A split design is employed on the impeller 120, which significantly lowers the difficulty of die sinking and the difficulty of processing of the impeller 120. Since the vanes 121 are vulnerable parts on the outboard engine, during its rotation underwater, damages due to collision with hard objects often occur, by employing a split structure, only one vane 121 is to be replaced in repairing, thus the repair cost is reduced. The clients may select the number of the vanes 121 by themselves to match the ships, for example, small ships demand high speed, thus a relatively small number of vanes 121 may be used; while heavy ships demand high torque and low rev, thus a relatively large number of vanes 121 may be used, thereby enhancing the flexibility of clients' choices.

Optionally, referring to FIG. 4, the external rotor 110 includes a permanent magnet 111 and a magnetic conducting ring 112, wherein the magnetic conducting ring 112 is provided outside the permanent magnet 111.

The impeller 120 is provided in a circumferential direction of the magnetic conducting ring 112. After power on, magnetic flux is produced between the stator mechanism 200 and the permanent magnet 111 as well as the magnetic conducting ring 112, and the permanent magnet 111 and the magnetic conducting ring 112 start to rotate around the axis of the stator mechanism 200. The impeller 120 is driven to rotate directly by means of the rotation of the permanent magnet 111 and the magnetic conducting ring 112, to provide torque and speed for the ship.

Figure 6:
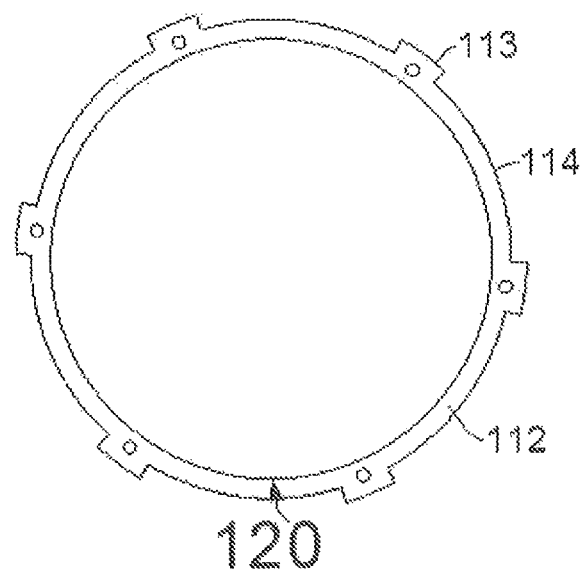
FIG. 6 is a structural schematic view of a magnetic conducting ring of the first direct-drive electric outboard engine provided in an embodiment of the present disclosure.

Optionally, referring to FIG. 5 and FIG. 6, a plurality of raised portions 113 are evenly distributed on the outer surface of the magnetic conducting ring 112, and a groove 114 is formed between each two adjacent raised portions 113. The impeller 120 includes a plurality of vanes 121 which are provided separately, wherein each vane 121 is fixedly connected with the magnetic conducting ring 112 by means of the respective groove 114.

Each vane 121 is mounted in the respective groove 114, since the vanes 121 are vulnerable parts in the outboard engine, during their rotation underwater, collision with hard objects often occurs, by mounting the vanes 121 inside the grooves 114 respectively, during the process in which the vanes 121 rotate and are subjected to forces, the raised portions 113 on the outer surface of the magnetic conducting ring 112 can bear a part of active force transmitted by the vanes 121, thus decreasing the probability of accidental loss of the vanes 121 during the rotation thereof, serving a function of protecting, fixing and supporting the vanes 121.

Optionally, each vane 121 includes a vane body 122 and a mounting block 123, wherein the vane body 122 and the mounting block 123 are integratedly formed, and the mounting block 123 is clamped (snapped) in the respective groove 114 and is in fixed connection with the magnetic conducting ring 112.

The mode of integrated formation can increase the strength and hardness of the vanes 121, improving the service life thereof; and each mounting block 123, after being clamped in the respective groove 114, may firmly fix the respective vane 121 on the magnetic conducting ring 112 by means of bolt-tightening.

Optionally, the stator mechanism 200 includes a fixed shaft 210 and a stator 220 sleeved on the fixed shaft 210.

The stator mechanism 200 is configured to cooperate with the external rotor mechanism 100, such that the external rotor mechanism 100 and the impeller 120 rotate around the axis of the fixed shaft 210 to provide rev and torque for the ship.

Optionally, the fixed shaft 210 is a hollow shaft. The design of the hollow shaft can realize simultaneous water-cooling of the stator mechanism 200 and the external rotor mechanism 100. The direct-drive electric outboard engine 10 in the present embodiment performs cooling simultaneously by means of the water-cooling of the hollow fixed shaft 210 and the exposure of the external rotor mechanism 100 in water, which remedies deficiency that only the stator mechanism 200 of the electric engine can be cooled with conventional structures, which is favorable for prolonging the service life of the direct-drive electric outboard engine 10, increasing power intensity of the electric engine and reducing temperature rise of the electric engine.

Optionally, in connection with FIG. 4, the direct-drive electric outboard engine 10 further includes a first end cap 300 and a second end cap 400, wherein the first end cap 300 and the second end cap 400 are respectively provided at two ends of the stator mechanism 200.

On the one hand, the first end cap 300 and the second end cap 400 can support the stator mechanism 200 to ameliorate force condition of the stator mechanism 200; and on the other hand, the first end cap 300 and the second end cap 400 further serve the function of blocking water from entering the stator mechanism 200 and alleviating water erosion on internal structures, prolonging the service life of the direct-drive electric outboard engine 10. Optionally, the relative fixation between the external rotor mechanism 100 and the first end cap 300 as well as the second end cap 400 is achieved by snapping or bolt fixing.

Optionally, in connection with FIG. 4, a first seal 1061 is provided between the first end cap 300 and the stator mechanism 200, and a second seal 1062 is provided between the second end cap 400 and the stator mechanism 200.

Specifically, the first seal 1061 is provided between the first end cap 300 and the fixed shaft 210, and the second seal 1062 is provided between the second end cap 400 and the fixed shaft 210, wherein the first seal 1061 and the second seal 1062 may be realized by means of oil seal, and erosion damage on internal structures of the stator mechanism 200 caused by moisture can be reduced by oil seal.

Optionally, in connection with FIG. 4, the direct-drive electric outboard engine 10 further includes a mounting base 500, wherein the mounting base 500 is sleeved on the fixed shaft 210 and is provided at a side of the first end cap 300 away from the external rotor 110.

The mounting base 500 is configured to support and fix the stator mechanism 200, which can ensure the stability of the stator mechanism 200. Optionally, the relative fixation between the mounting base 500 and the first end cap 300 is achieved by snapping or bolt fixing.

Optionally, in connection with FIG. 4, the direct-drive electric outboard engine 10 further includes a first bearing 600 and a second bearing 700; wherein the first bearing 600 is located between the fixed shaft 210 and the first end cap 300; and the second bearing 700 is located between the fixed shaft 210 and the second end cap 400.

The first bearing 600 and the second bearing 700 are respectively provided at two ends of the fixed shaft 210, which can ameliorate force condition of the fixed shaft 210 and prolong the service life of the fixed shaft 210.

Optionally, in connection with FIG. 4, the direct-drive electric outboard engine 10 further includes a first fairwater 800 and a second fairwater 900, wherein the first fairwater 800 is mounted at one end of the stator mechanism 200; and the second fairwater 900 is mounted at the other end of the stator mechanism 200.

The first fairwater 800 and the second fairwater 900 can ameliorate the force condition of the direct-drive electric outboard engine 10 under active force from water to reduce the resistance force to which the direct-drive electric outboard engine 10 is subjected during the process of advancing.

Figure 2:
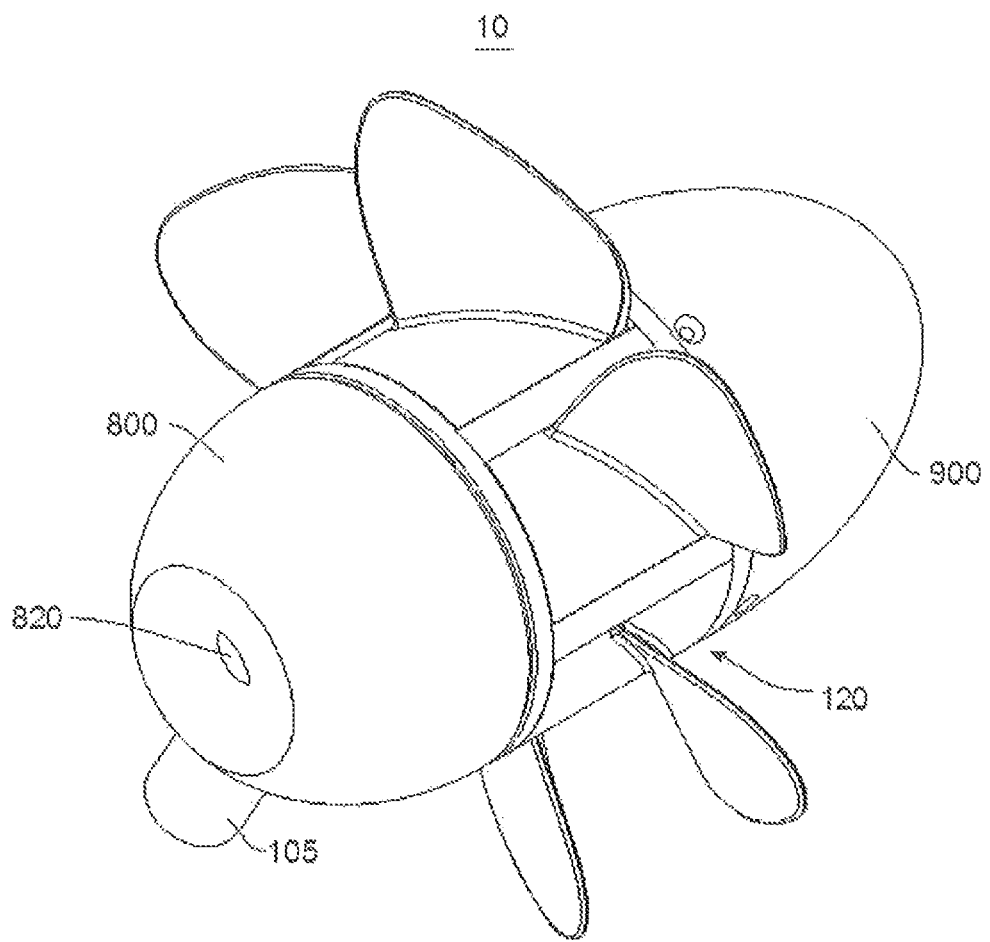
FIG. 2 is a structural schematic view, from a second angle of view, of the first direct-drive electric outboard engine provided in an embodiment of the present disclosure.

Optionally, in connection with FIG. 1, FIG. 2 and FIG. 4, the stator mechanism 200 includes a fixed shaft 210; wherein the fixed shaft 210 is a hollow shaft; the first fairwater 800 is provided with a first through hole 820, and the first through hole 820 communicates with one end of the fixed shaft 210; the second fairwater 900 is provided with a second through hole 920 and the second through hole 920 communicates with the other end of the fixed shaft 210.

During the process of advancing of the direct-drive electric outboard engine 10, water may enter the fixed shaft 210 via the first through hole 820 and flow out via the second through hole 920.

Optionally, in connection with FIG. 4, the direct-drive electric outboard engine 10 further includes a controller module 101; a first controller mounting area 810 is provided inside the first fairwater 800, wherein the controller module 101 is located in the first controller mounting area 810; or, a second controller mounting area 910 is provided inside the second fairwater 900 and the controller module 101 is provided in the second controller mounting area 910.

The controller module 101 may be mounted in the first controller mounting area 810 or the second controller mounting area 910. An appropriate controller mounting area may be selected for the controller module based on different circuits and power source locations, with no need to add any other auxiliary equipment, thus the space may be utilized in a reasonable way and the dimension of the entire the direct-drive electric outboard engine 10 may be reduced.

The controller module 101 may control rev, rotation direction and the like of the impeller 120.

Optionally, in connection with FIG. 1-FIG. 4, the second fairwater 900 is provided to be movable relative to the stator mechanism 200, wherein the second fairwater 900 can rotate following the rotation of the external rotor mechanism 100.

In this way, the scope of cavitation region can be reduced and the occurrence of cavitation can be reduced, thus ameliorating the force condition of the direct-drive electric outboard engine 10 in the present embodiment under active force from water and reducing the resistance force to which the direct-drive electric outboard engine 10 is subjected during the process of advancing.

Figure 8:
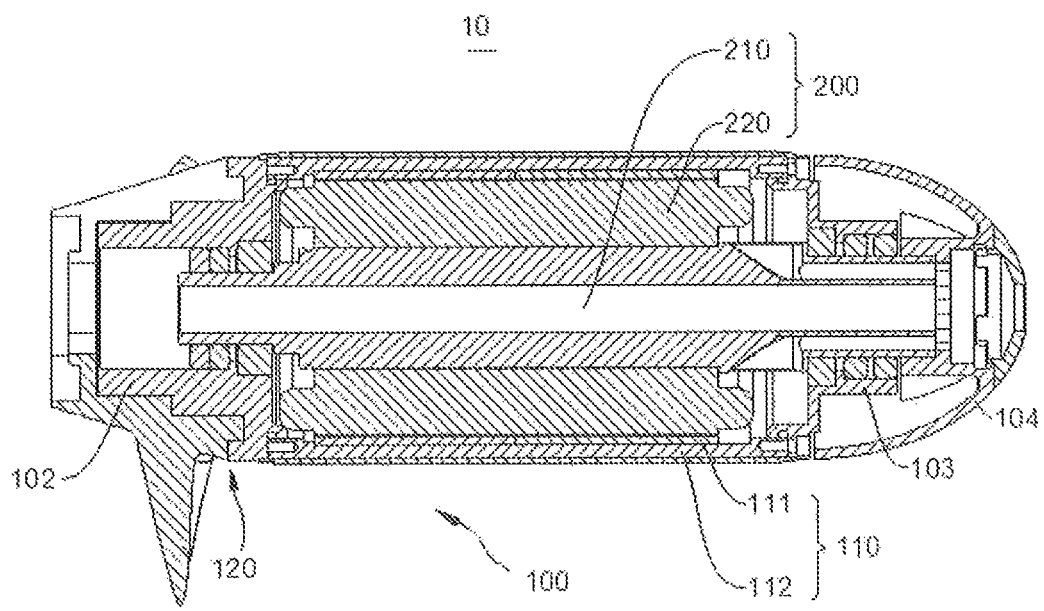
FIG. 8 is a structural schematic view, from a second angle of view, of the second direct-drive electric outboard engine provided in an embodiment of the present disclosure.

Optionally, in connection with FIG. 8, the direct-drive electric outboard engine 10 further includes a third end cap 102, wherein the third end cap 102 is provided at an end of the stator mechanism 200, the third end cap 102 is relatively fixed to the external rotor 110, and the impeller 120 is in fixed connection with the third end cap 102.

It can be understood that the third end cap 102, the permanent magnet 111 and the magnetic conducting ring 112 are each fixed relative to one another. After power on, magnetic flux is produced between the stator mechanism 200 and the permanent magnet 111 as well as the magnetic conducting ring 112, and the permanent magnet 111 and the magnetic conducting ring 112 start to rotate around the axis of the stator mechanism 200. When rotating, the external rotor 110 drives the third end cap 102 to rotate, meanwhile the third end cap 102 drives the impeller 120 to rotate to provide torque and speed for the ship.

Optionally, the direct-drive electric outboard engine 10 further includes a fourth end cap 103 and a third fairwater 104, wherein the fourth end cap 103 is provided at one end of the stator mechanism 200 away from the third end cap 102, the third fairwater 104 is mounted at an end of the stator mechanism 200 close to the fourth end cap 103, and the third fairwater 104 and the stator mechanism 200 are relatively fixed.

It can be understood that the third end cap 102 and the fourth end cap 103 are respectively provided at two ends of the stator mechanism 200, and are both running-fitted with the fixed shaft 210. After power on, each of the third end cap 102, the fourth end cap 103, the external rotor 110 and the impeller 120 rotate relative to the fixed shaft 210. The fourth end cap 103 may serve a certain support function for the stator mechanism 200, and the third fairwater 104 can ameliorate the force condition of the direct-drive electric outboard engine 10 under active force from water to reduce the resistance force to which the direct-drive electric outboard engine 10 is subjected during the process of advancing.

Figure 7:
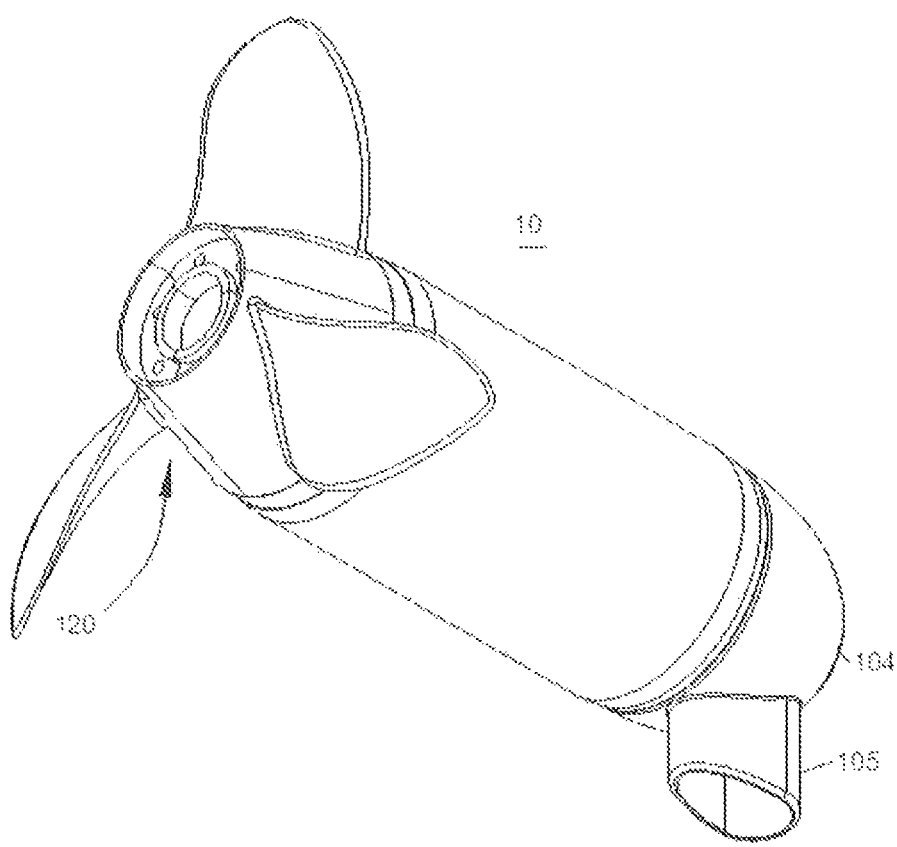
FIG. 7 is a structural schematic view, from a first angle of view, of a second direct-drive electric outboard engine provided in an embodiment of the present disclosure.

Referring to FIG. 7 to FIG. 8, embodiments of the present disclosure further provide a second direct-drive electric outboard engine 10, including an external rotor mechanism 100, a stator mechanism 200 and a third end cap 102;

wherein the external rotor mechanism 100 includes an external rotor 110 and an impeller 120;

the external rotor 110 is located outside the stator mechanism 200;

the third end cap 102 is provided at an end of the stator mechanism 200, and the third end cap 102 is relatively fixed to the external rotor 110; and the impeller 120 is sleeved on the third end cap 102 and is in fixed connection with the third end cap 102.

It can be understood that in the second direct-drive electric outboard engine 10, the third end cap 102 is relatively fixed to the external rotor 110 and rotates along with the external rotor 110. After power on, since the third end cap 102 is relatively fixed to the impeller 120, magnetic flux is produced between the stator mechanism 200 and the permanent magnet 111 as well as the magnetic conducting ring 112, and the permanent magnet 111 and the magnetic conducting ring 112 start to rotate around the axis of the stator mechanism 200. When rotating, the external rotor 110 drives the third end cap 102 to rotate, meanwhile the third end cap 102 drives the impeller 120 to rotate to provide torque and speed for the ship.

Optionally, the direct-drive electric outboard engine 10 further includes a fourth end cap 103 and a third fairwater 104, wherein the fourth end cap 103 is provided at an end of the stator mechanism 200 away from the third end cap 102, the third fairwater 104 is mounted at an end of the stator mechanism 200 close to the fourth end cap 103, and the third fairwater 104 and the stator mechanism 200 are relatively fixed.

It can be understood that the third end cap 102 and the fourth end cap 103 are respectively provided at two ends of the stator mechanism 200, and are both running-fitted with the fixed shaft 210. After power on, each of the third end cap 102, the fourth end cap 103, the external rotor 110 and the impeller 120 rotate relative to the fixed shaft 210. The fourth end cap 103 may serve a certain support function for the stator mechanism 200, and the third fairwater 104 can ameliorate the force condition of the direct-drive electric outboard engine 10 under active force from water to reduce the resistance force to which the direct-drive electric outboard engine 10 is subjected during the process of advancing.

Figure 9:
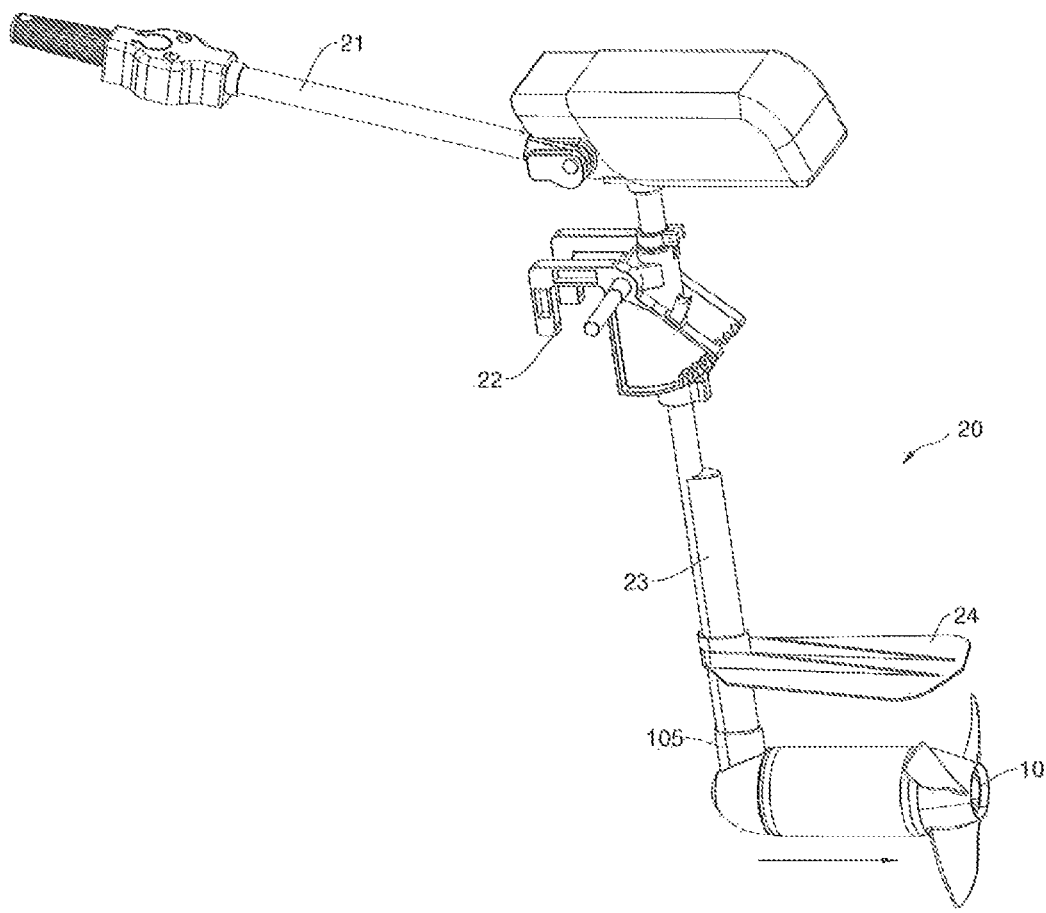
FIG. 9 is a structural schematic view of an outboard engine system provided in an embodiment of the present disclosure.

In connection with FIG. 9, embodiments of the present disclosure further provide an outboard engine system 20 including the above described direct-drive electric outboard engine 10.

The outboard engine system 20 further includes an operation control structure 21, a mounting structure 22, a support structure 23 and an anti-vortex baffle 24, wherein the operation control structure 21 is mounted on the support structure 23, the mounting structure 22 is connected with the support structure 23 and is configured to be mounted on a ship, the anti-vortex baffle 24 is mounted on the support structure 23, and the direct-drive electric outboard engine 10 is mounted on the support structure 23.

Specifically, in the direct-drive electric outboard engine 10 as illustrated in FIG. 1-FIG. 6, the first fairwater 800 is provided thereon with a mounting portion 105, wherein the mounting portion 105 is in fixed connection with the support structure 23; in the direct-drive electric outboard engine 10 as illustrated in FIG. 7-FIG. 8, the third fairwater 104 is provided thereon with a mounting portion 105, wherein the mounting portion 105 is in fixed connection with the support structure 23.

In FIG. 9, the direction indicated by the arrow below the direct-drive electric outboard engine 10 is the direction of passing water.

In Some Embodiments

Figure 3:
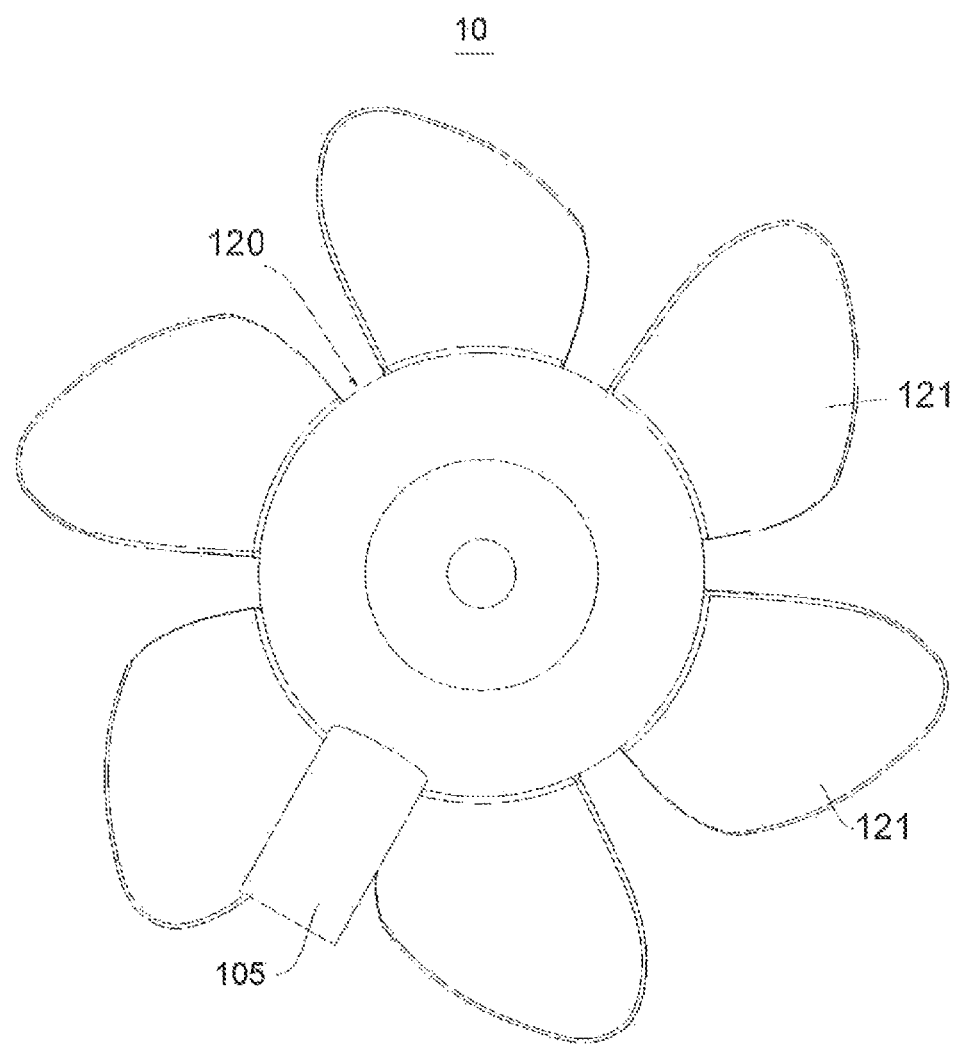
FIG. 3 is a structural schematic view, from a third angle of view, of the first direct-drive electric outboard engine provided in an embodiment of the present disclosure.

Referring to FIG. 1-FIG. 3, the direct-drive electric outboard engine 10 as illustrated in FIG. 1-FIG. 3 includes a first fairwater 800, an external rotor mechanism 100 and a second fairwater 900, wherein the external rotor mechanism 100 is located between the first fairwater 800 and the second fairwater 900, the first fairwater 800 is provided thereon with a mounting portion 105 and a first through hole 820, the external rotor mechanism 100 includes an impeller 120, the second fairwater 900 is provided with a second through hole 920, and the number of vanes 121 is 6.

Referring to FIG. 4, the direct-drive electric outboard engine 10 as illustrated in FIG. 4 includes an external rotor mechanism 100, a stator mechanism 200, a first end cap 300, a second end cap 400, a mounting base 500, a first bearing 600, a second bearing 700, a first fairwater 800 and a second fairwater 900; wherein the external rotor mechanism 100 includes an external rotor 110 and an impeller 120, wherein the external rotor 110 includes a permanent magnet 111 and a magnetic conducting ring 112, the impeller 120 includes a plurality of vanes 121, and the stator mechanism 200 includes a fixed shaft 210 and a stator 220; wherein the stator 220 is located outside the fixed shaft 210, the permanent magnet 111 is located outside the stator 220, the magnetic conducting ring 112 is located outside the permanent magnet 111, and the vanes 121 are located outside the magnetic conducting ring 112; the first end cap 300 and the second end cap 400 are respectively mounted at two ends of the stator mechanism 200, wherein the first bearing 600 is mounted between the first end cap 300 and the fixed shaft 210, the second bearing 700 is mounted between the second end cap 400 and the fixed shaft 210, the first end cap 300 and the second end cap 400 are each running-fitted with the fixed shaft 210, a first seal 1061 is provided between the first end cap 300 and the fixed shaft 210, and a second seal 1062 is provided between the second end cap 400 and the fixed shaft 210; the first end cap 300 and the second end cap 400 are both relatively fixed to the external rotor 110; the mounting base 500 is sleeved on the fixed shaft 210 and is located at a side of the first end cap 300 away from the external rotor 110; the first fairwater 800 and the second fairwater 900 are respectively provided at two ends of the stator mechanism 200, wherein the first fairwater 800 is provided with a mounting portion 105, a first controller mounting area 810 and a first through hole 820, the second fairwater 900 is provided with a second controller mounting area 910 and a second through hole 920, the fixed shaft 210 is a hollow shaft, the two ends of the fixed shaft 210 respectively communicate with the first through hole 820 and the second through hole 920, and a controller module 101 is mounted in the first controller mounting area 810.

Referring to FIG. 5 and FIG. 6, a plurality of raised portions 113 are provided on the outer side of the magnetic conducting ring 112, and a groove 114 is formed between each two adjacent raised portions 113. Each vane 121 includes a vane body 122 and a mounting block 123 which are integratedly formed, wherein the mounting block 123 is clamped (snapped) in the respective groove 114 and is relatively fixed to the magnetic conducting ring 112.

Referring to FIG. 7 and FIG. 8, the direct-drive electric outboard engine 10 as illustrated in FIG. 7 and FIG. 8 includes an external rotor mechanism 100, a stator mechanism 200, a third end cap 102, a fourth end cap 103 and a third fairwater 104; wherein the external rotor mechanism 100 includes an external rotor 110 and an impeller 120, the external rotor 110 includes a permanent magnet 111 and a magnetic conducting ring 112, and the stator mechanism 200 includes a fixed shaft 210 and a stator 220; wherein the stator 220 is located outside the fixed shaft 210, the permanent magnet 111 is located outside the stator 220, the magnetic conducting ring 112 is located outside the permanent magnetic 111, the third end cap 102 and the fourth end cap 103 are respectively provided at two ends of the stator mechanism 200, the third end cap 102 and the fourth end cap 103 are both relatively fixed to the external rotor 110 and are both running-fitted with the fixed shaft 210, the impeller 120 is sleeved on the third end cap 102 and is in fixed connection with the third end cap 102; and the third fairwater 104 is mounted at an end of the stator mechanism 200 close to the fourth end cap 103, the third fairwater 104 is relatively fixed to the stator mechanism 200, and the third fairwater 104 is provided with a mounting portion 105.

Referring to FIG. 9, the outboard engine system 20 as illustrated in FIG. 9 includes an operation control structure 21, a mounting structure 22, a support structure 23, an anti-vortex baffle 24 and a direct-drive electric outboard engine 10, wherein the operation control structure 21 is mounted on the support structure 23, the mounting structure 22 is connected with the support structure 23 and is configured to be mounted on a ship, the anti-vortex baffle 24 is mounted on the support structure 23, and the direct-drive electric outboard engine 10 is mounted on the support structure 23 by means of the mounting portion 105.

The above described is merely detailed description of the embodiments of the present disclosure, but the protection scope of the present disclosure is not limited thereto, any modification or substitution within the technical scope disclosed by the present disclosure which is readily conceivable by those skilled in the art, shall fall within the protection scope of the present disclosure. Therefore, the protection scope of the present disclosure shall be subject to the protection scope of the claims.

INDUSTRIAL APPLICABILITY

In conclusion, the present disclosure provides a direct-drive electric outboard engine and an outboard engine system with high drive efficiency and strong load capacity, enabling to simultaneously meet the requirements on rev and torque from various types of ships.

The invention claimed is:

1. A direct-drive electric outboard engine, comprising an external rotor mechanism, a stator mechanism, a first end cap, a second end cap, a first fairwater and a second fairwater and a controller module,
   wherein the external rotor mechanism comprises an external rotor and an impeller;
   the external rotor is located outside the stator mechanism;
   the impeller is located outside the external rotor,
     the first end cap and the second end cap are respectively provided at two ends of the stator mechanism;
     the first fairwater is mounted at one end of the stator mechanism, and the second fairwater is mounted at the other end of the stator mechanism,
     a first seal is provided between the first end cap and the stator mechanism, a second seal is provided between the second end cap and the stator mechanism, and the first seal and the second seal are realized by oil seal; and
     a first controller mounting area is provided inside the first fairwater, and the controller module is located in the first controller mounting area, or a second controller mounting area is provided inside the second fairwater, and the controller module is located in the second controller mounting area; and the second fairwater is provided to be movable with respect to the stator mechanism, and the second fairwater is configured to be rotatable along with the external rotor mechanism.

2. The direct-drive electric outboard engine according to claim 1, wherein the impeller comprises a plurality of vanes which are provided separately, and each of the vanes is in fixed connection with the external rotor.

3. The direct-drive electric outboard engine according to claim 1, wherein the external rotor comprises a permanent magnet and a magnetic conducting ring, and the magnetic conducting ring is located outside the permanent magnet.

4. The direct-drive electric outboard engine according to claim 3, wherein a plurality of raised portions are evenly distributed on an outer surface of the magnetic conducting ring, a groove is formed between each two adjacent raised portions, the impeller comprises a plurality of vanes which are provided separately, and each of the vanes is fixedly connected with the magnetic conducting ring by means of the respective groove.

5. The direct-drive electric outboard engine according to claim 4, wherein each of the vanes comprises a vane body and a mounting block, the vane body and the mounting block are integratedly formed, and the mounting block is clamped in the respective groove and is in fixed connection with the magnetic conducting ring.

6. The direct-drive electric outboard engine according to claim 1, wherein the stator mechanism comprises a fixed shaft and a stator sleeved on the fixed shaft.

7. The direct-drive electric outboard engine according to claim 6, wherein the fixed shaft is a hollow shaft.

8. The direct-drive electric outboard engine according to claim 6, further comprising a mounting base, wherein the mounting base is sleeved on the fixed shaft and is located at a side of the first end cap away from the external rotor.

9. The direct-drive electric outboard engine according to claim 6, further comprising a first bearing and a second bearing,
   wherein the first bearing is located between the fixed shaft and the first end cap; and
   the second bearing is located between the fixed shaft and the second end cap.

10. The direct-drive electric outboard engine according to claim 1, wherein the stator mechanism comprises a fixed shaft;
   wherein the fixed shaft is a hollow shaft;
     the first fairwater is provided with a first through hole, and the first through hole communicates with one end of the fixed shaft; and
     the second fairwater is provided with a second through hole, and the second through hole communicates with the other end of the fixed shaft.

11. The direct-drive electric outboard engine according to claim 1, further comprising a third end cap, wherein the third end cap is provided at an end of the stator mechanism, the third end cap is relatively fixed to the external rotor, and the impeller is in fixed connection with the third end cap.

12. The direct-drive electric outboard engine according to claim 11, further comprising a fourth end cap and a third fairwater,
   wherein the fourth end cap is provided at one end of the stator mechanism away from the third end cap, the third fairwater is mounted at an end of the stator mechanism close to the fourth end cap, and the third fairwater is relatively fixed to the stator mechanism.

13. An outboard engine system, comprising the direct-drive electric outboard engine of claim 1.

* * * * *